United States Patent
Shimizu

(10) Patent No.: US 8,200,419 B2
(45) Date of Patent: Jun. 12, 2012

(54) BRAKING CONTROL SYSTEM AND BRAKING CONTROL METHOD

(75) Inventor: Masayuki Shimizu, Suntou-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 593 days.

(21) Appl. No.: 12/310,044

(22) PCT Filed: Aug. 14, 2007

(86) PCT No.: PCT/IB2007/002342
§ 371 (c)(1),
(2), (4) Date: Feb. 9, 2009

(87) PCT Pub. No.: WO2008/020290
PCT Pub. Date: Feb. 21, 2008

(65) Prior Publication Data
US 2009/0326820 A1    Dec. 31, 2009

(30) Foreign Application Priority Data
Aug. 15, 2006  (JP) .................. 2006-221550

(51) Int. Cl.
*G08G 1/16* (2006.01)
(52) U.S. Cl. .................... 701/301; 701/70
(58) Field of Classification Search .......... 701/301, 701/300, 70, 96, 53, 54, 41, 78, 79, 83; 180/169, 180/197, 274; 340/904, 933, 435, 903, 436; 342/71
See application file for complete search history.

(56) References Cited

U.S. PATENT DOCUMENTS

| | | | |
|---|---|---|---|
| 5,699,040 A * | 12/1997 | Matsuda ................. | 340/435 |
| 6,017,102 A | 1/2000 | Aga | |
| 6,259,992 B1 | 7/2001 | Urai et al. | |
| 6,275,772 B1 | 8/2001 | Sugimoto et al. | |
| 6,604,042 B2 * | 8/2003 | Maruko et al. ............ | 701/96 |
| 7,259,711 B2 * | 8/2007 | Okai et al. ................ | 342/71 |
| 2004/0122578 A1 * | 6/2004 | Isaji et al. ................ | 701/70 |
| 2004/0193351 A1 * | 9/2004 | Takahashi et al. ......... | 701/70 |
| 2005/0033516 A1 * | 2/2005 | Kawasaki ................. | 701/301 |
| 2005/0267683 A1 * | 12/2005 | Fujiwara et al. ......... | 701/301 |

FOREIGN PATENT DOCUMENTS

| | | |
|---|---|---|
| DE | 197 50 913 A1 | 5/1998 |
| DE | 199 25 643 A1 | 12/1999 |
| DE | 199 48 365 A1 | 5/2000 |
| EP | 1 418 104 A2 | 5/2004 |
| JP | A-05-039010 | 2/1993 |

(Continued)

*Primary Examiner* — Thomas G. Black
*Assistant Examiner* — Marthe Marc-Coleman
(74) *Attorney, Agent, or Firm* — Oliff & Berridge, PLC

(57) ABSTRACT

A braking control system (1) includes: an ECU (20) that determines the likelihood of collision with an object based on detection results by a millimeter wave radar (10), a stereo camera (11) and the like; a brake actuator (30) that automatically applies a braking force based on the determination results; a steering angle sensor (14) that detects the steering condition by a driver; and so forth. When it is determined that a collision with an object is likely and automatic braking is started, and it is subsequently determined that a collision with the object is avoided through a steering operation by the driver, the ECU (20) sets a smaller gradient with which the target deceleration (target braking force) in the automatic braking is reduced in comparison to when a collision with the object is avoided not through the steering operation by the driver.

14 Claims, 8 Drawing Sheets

FOREIGN PATENT DOCUMENTS

| | | |
|---|---|---|
| JP | A-05-058257 | 3/1993 |
| JP | A-06-325297 | 11/1994 |
| JP | A-2000-142281 | 5/2000 |
| JP | A-2002-274345 | 9/2002 |
| JP | A-2003-112618 | 4/2003 |
| JP | A-2003-175809 | 6/2003 |
| JP | A-2004-142654 | 5/2004 |
| JP | A-2004-155241 | 6/2004 |
| JP | A-2004-189116 | 7/2004 |
| JP | A-2005-199886 | 7/2005 |

* cited by examiner

BRAKING CONTROL SYSTEM AND BRAKING CONTROL METHOD

BACKGROUND OF THE INVENTION

1. Field of the Invention

The present invention relates to a braking control system and braking control method for a vehicle.

2. Description of the Related Art

In an existing braking control system for a vehicle, a braking force is automatically generated to avoid colliding with an object, such as a preceding vehicle, when it is determined that a collision with the object is likely. Japanese Patent Application Publication No. 2003-175809 (JP-A-2003-175809) describes a braking control system for a vehicle in which a gradually increasing braking force is generated when it is predicted that avoidance by braking and/or steering will be impossible after a specified time elapses, and a larger braking force is generated when avoidance by braking and/or steering actually becomes impossible.

The system described in Japanese Patent Application Publication No. 2003-175809 (JP-A-2003-175809), however, does not discuss how to release the braking force after automatic braking is started and when a collision is avoided through a steering operation by the driver. If the automatic braking is canceled abruptly, the behavior of the vehicle may become unstable.

SUMMARY OF THE INVENTION

The present invention provides a braking control system and braking control method for a vehicle that cancels automatic braking while preventing the behavior of the vehicle from becoming unstable when collision with an object is predicted and automatic braking is started, and then collision is avoided through a steering operation by the driver.

One aspect of the present invention is directed to a braking control system including: a collision probability determination device that determines the likelihood of collision with an object; a braking device that automatically applies a braking force when the collision probability determination device determines that a collision with the object is likely; and a steering operation detection device that detects a steering operation by a driver, in which when it is determined that a collision with the object is likely and automatic braking is started, and subsequently it is determined that a collision with the object is avoided through a steering operation by the driver, the braking device increases the duration of the automatic braking in comparison to when a collision with the object is avoided not through the steering operation by the driver.

According to the braking control system of this aspect, when it is determined that a collision with an object is avoided through a steering operation by the driver, the duration of automatic braking is increased in comparison to when a collision with the object is avoided not through the steering operation by the driver. Thus, the behavior of the vehicle is stabilized when the vehicle speed is reduced during times when the driver steers to avoid the object. In addition, it is possible to restrict changes in pitch (pitching) of the vehicle due to cancellation of the automatic braking. As a result, it is possible to cancel the automatic braking while preventing the behavior of the vehicle from becoming unstable.

In the braking control system of the above aspect, the braking device may decrease the gradient with which to reduce the braking force for increasing the duration of the automatic braking. In this way, because the gradient with which to reduce the braking force is reduced and thereby the braking force is gradually reduced, it is possible to restrict changes in pitch of the vehicle due to cancellation of the automatic braking.

In the braking control system of the above aspect, the braking device may increase the time that a constant braking force is maintained in order to increase the duration of the automatic braking. In this case, a constant braking force is maintained for an extended period. Thus, it is possible to stabilize the behavior of the vehicle due to a steering operation for avoidance over that period.

The braking control system of the above aspect may further include an avoidance indicator detection device that detects an indicator of a steering operation by the driver, and the braking device may set the magnitude of the braking force based on the indicator detected by the avoidance indicator detection device. In this way, the magnitude of the braking force is set based on the detected indicator detected by the avoidance indicator detection device. Thus, it is possible to set a more appropriate braking force based on the behavior of the vehicle. The indicator of a steering operation for avoidance may be the lateral force on a tire, the lateral acceleration of the vehicle, the steering amount, and the vehicle speed, for example.

Alternatively, the braking device may instead set the duration of the automatic braking based on the indicator detected by the avoidance indicator detection device. In this way, the duration of the automatic braking is set based on the indicator detected by the avoidance indicator detection device. Thus, it is possible to set a more appropriate duration based on the behavior of the vehicle.

A second aspect of the present invention is directed to a braking control method including: determining the likelihood of collision with an object; automatically applying a braking force when it is determined that a collision with the object is likely; detecting a steering operation by a driver; and when it is determined that a collision with the object is likely and automatic braking is started, and it is subsequently determined that a collision with the object is avoided through a steering operation by the driver, the duration of the automatic braking is increased in comparison to when a collision with the object is avoided not through the steering operation by the driver.

According to this aspect of the present invention, it is possible to cancel automatic braking while preventing the behavior of the vehicle from becoming unstable when it is determined that a collision with an object is likely and automatic braking is started, and then the collision with the object is avoided through a steering operation by a driver.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EXAMPLE EMBODIMENTS

Figure 1:
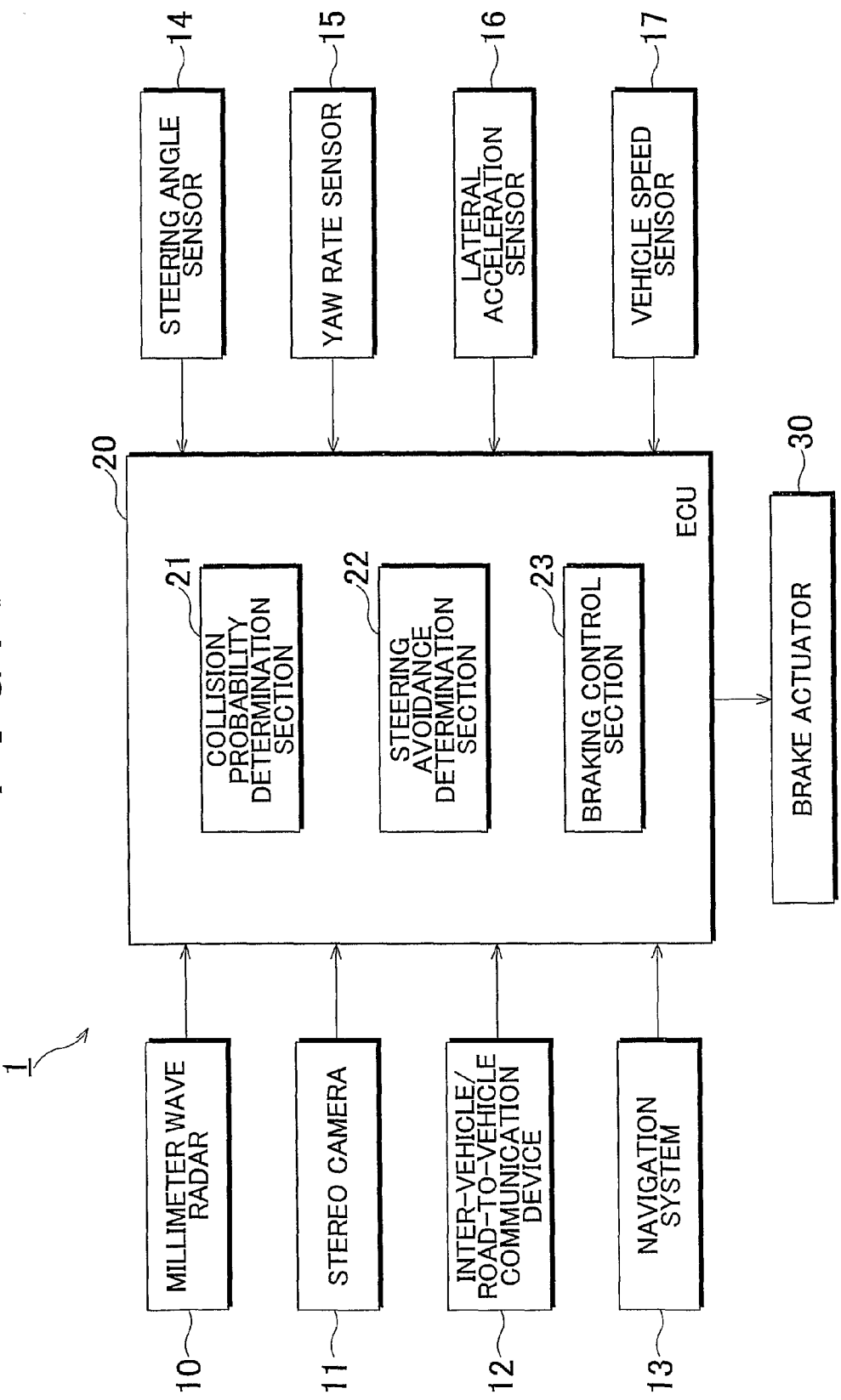
FIG. 1 is a block diagram showing the configuration of a braking control system in accordance with an embodiment.

An example embodiment of the present invention will be described in detail below with reference to the drawings. In the drawings, the same reference numerals denote the same or corresponding component parts. First, the configuration of a braking control system 1 in accordance with the embodiment is described with reference to FIG. 1. FIG. 1 is a block diagram showing the configuration of the braking control system 1.

In the braking control system 1, a millimeter wave radar 10, a stereo camera 11 and so forth recognize another vehicle or an object in the path of the vehicle. An electronic control unit (hereinafter referred to as "ECU") 20 determines the likelihood of collision with the object based on the distance, speed, and direction of the vehicle relative to the object. If it is determined that the likelihood of collision is high, the ECU 20 drives a brake actuator 30 to perform automatic braking, independently of operation of a brake pedal, in order to decelerate the vehicle. On the other hand, when it is determined that a collision with an object is likely and automatic braking is started, and it is subsequently determined that the collision with the object has been avoided, the braking control system 1 cancels the automatic braking being executed. At this time, when it is determined that a collision with the objected has been avoided through a steering operation by a driver based on the results detected by a steering angle sensor 14 and so forth, the duration of the automatic braking is increased in comparison to when a collision with the object is avoided through a means other than the steering operation by the driver. A more specific operation will be described as follows.

The millimeter wave radar 10 emits a radio wave in the millimeter wave band ahead of the vehicle while scanning horizontally, and receives a reflected wave from the surface of an object such as another vehicle, to detect the distance, speed, and direction relative to the object. The direction to the object is detected based on the angle of the reflected wave. The distance to the object is detected based on the time from the emission of the radio wave to the return of the reflected wave. The speed of the object is detected based on changes in frequency (Doppler effect) of the reflected wave. At a curve, the radius of the curve is estimated based on information from the steering angle sensor 14 and a yaw rate sensor 15 discussed later, and so forth, to correct the traveling direction. The detection results by the millimeter wave radar 10 are output to the ECU 20.

The stereo camera 11 has a pair of CCD cameras for acquiring images of an object such as another vehicle, and an image processing section for detecting an object from the acquired images by image recognition. The image processing section extracts a candidate for an object from the images captured with the CCD cameras by edge extraction, pattern recognition or the like. Also, the image processing section obtains the distance to the object and the lateral displacement from the vehicle by triangulation based on the difference in position of the object between the left and right acquired images, and obtains the relative speed based on changes in distance between the current and preceding frames. The detection results are output to the ECU 20.

The braking control system 1 may include an inter-vehicle/road-to-vehicle communication device 12 for exchanging running condition information between the vehicle and another vehicle or a device installed on the road via wireless communication. The inter-vehicle/road-to-vehicle communication device 12 has a receiver for receiving running condition information of another vehicle, such as the running position, running speed, turning signal information, brake information, and accelerator information of another vehicle, transmitted from another vehicle or a device installed on the road, and a transmitter for transmitting running condition information of the vehicle to another vehicle.

The inter-vehicle/road-to-vehicle communication device 12 and the ECU 20 are connected via a communication line such as CAN (controller area network) to allow data exchange between each other. The running condition information of another vehicle acquired by the inter-vehicle/road-to-vehicle communication device 12 is sent to the ECU 20 via this communication line.

The ECU 20 is also connected via a communication line with a navigation system 13 for guiding the vehicle to a destination by acquiring road information, position information of the vehicle, and so on. The navigation system 13 detects the position of the vehicle based on a GPS (global positioning system) satellite signal received with a GPS receiver. Also, the navigation system 13 calculates the traveling distance based on a vehicle speed signal, and detects the traveling direction of the vehicle according to a signal from a gyro sensor. In addition, the navigation system 13 acquires road information such as the configuration of lanes, the arrangement of intersections and traffic signals, the curvature of roads, and so forth, from a hard disk or a DVD installed. The navigation system 13 may be equipped with a communication function to acquire road information or the like from a base station installed externally of the vehicle. The acquired road information and vehicle position information are transmitted to the ECU 20 via the communication line.

Meanwhile, the braking control system 1 includes the steering angle sensor 14 for detecting the steering angle of a steering wheel, the yaw rate sensor 15 for detecting the yaw rate of the vehicle, a lateral acceleration sensor 16 for detecting the lateral acceleration of the vehicle, and a vehicle speed sensor 17 for detecting the speed of the vehicle. These sensors are also connected to the ECU 20, and detection signals are output to the ECU 20.

The ECU 20 includes a microprocessor for performing calculation, a ROM for storing a program or the like for causing the microprocessor to execute respective processes, a RAM for storing various data such as calculation results, a backup RAM that operates on a 12V battery to keep storage contents, and so forth. Configured in this way, the ECU 20 includes a collision probability determination section 21, a steering avoidance determination section 22, and a braking control section 23.

The collision probability determination section 21 obtains the distance, speed, and direction relative to an object in the path of the vehicle, such as another vehicle, based on the detection results input from the millimeter wave radar 10, the stereo camera 11 and so forth, and the various information acquired from the inter-vehicle/road-to-vehicle communication device 12 and the navigation system 13, to determine the likelihood of collision with the object. In order to determine the likelihood of collision with the object, it is preferable to consider the steering angle of the steering wheel, the yaw rate of the vehicle, an assist torque of an electric power steering device, and so forth. The collision probability determination section 21 as a component of the ECU 20 may be considered as the collision probability determination device. The determination results as to the likelihood of collision are output to the braking control section 23.

The steering avoidance determination section 22 determines whether a collision with the object has been avoided through a steering operation by the driver based on the detection results input from the steering angle sensor 14, the yaw rate sensor 15, the lateral acceleration sensor 16, and the vehicle speed sensor 17. The determination results as to whether a collision with the object has been avoided through a steering operation a steering operation by the driver, are output to the braking control section 23.

The braking control section 23 generates an automatic braking control signal for driving a brake actuator 30, discussed later, based on the determination results as to the likelihood of collision input from the collision probability determination section 21 and the determination results as to whether a collision with the object has been avoided by a steering operation input from the steering avoidance determination section 22. More specifically, if the collision probability determination section 21 determines that collision with the object is likely, the braking control section 23 drives the brake actuator 30 to perform automatic braking, independently of operation of the brake pedal, in order to decelerate the vehicle. When automatic braking is started, and it is subsequently determined that the collision with the object has been avoided, the automatic braking being executed is canceled. At this time, if the steering avoidance determination section 22 determines that the collision with the object has been avoided through a steering operation by the driver, the duration of the automatic braking is increased in comparison to when the collision with the object is avoided through a means other than the steering operation by the driver. The brake actuator 30 is connected to the ECU 20, and the automatic braking control signal generated by the braking control section 23 is output to the brake actuator 30.

The brake actuator 30 controls the hydraulic pressure that is supplied to a wheel cylinder for actuating a brake attached to each wheel of the vehicle. The brake actuator 30 supplies the wheel cylinder with a hydraulic pressure in accordance with the amount of depression of the brake pedal, and supplies the wheel cylinder with a hydraulic pressure based on the automatic braking control signal generated by the braking control section 23, independently of operation of the brake pedal. The braking control section 23 and the brake actuator 30 as components of the ECU 20 can be considered as the braking device.

Figure 2:
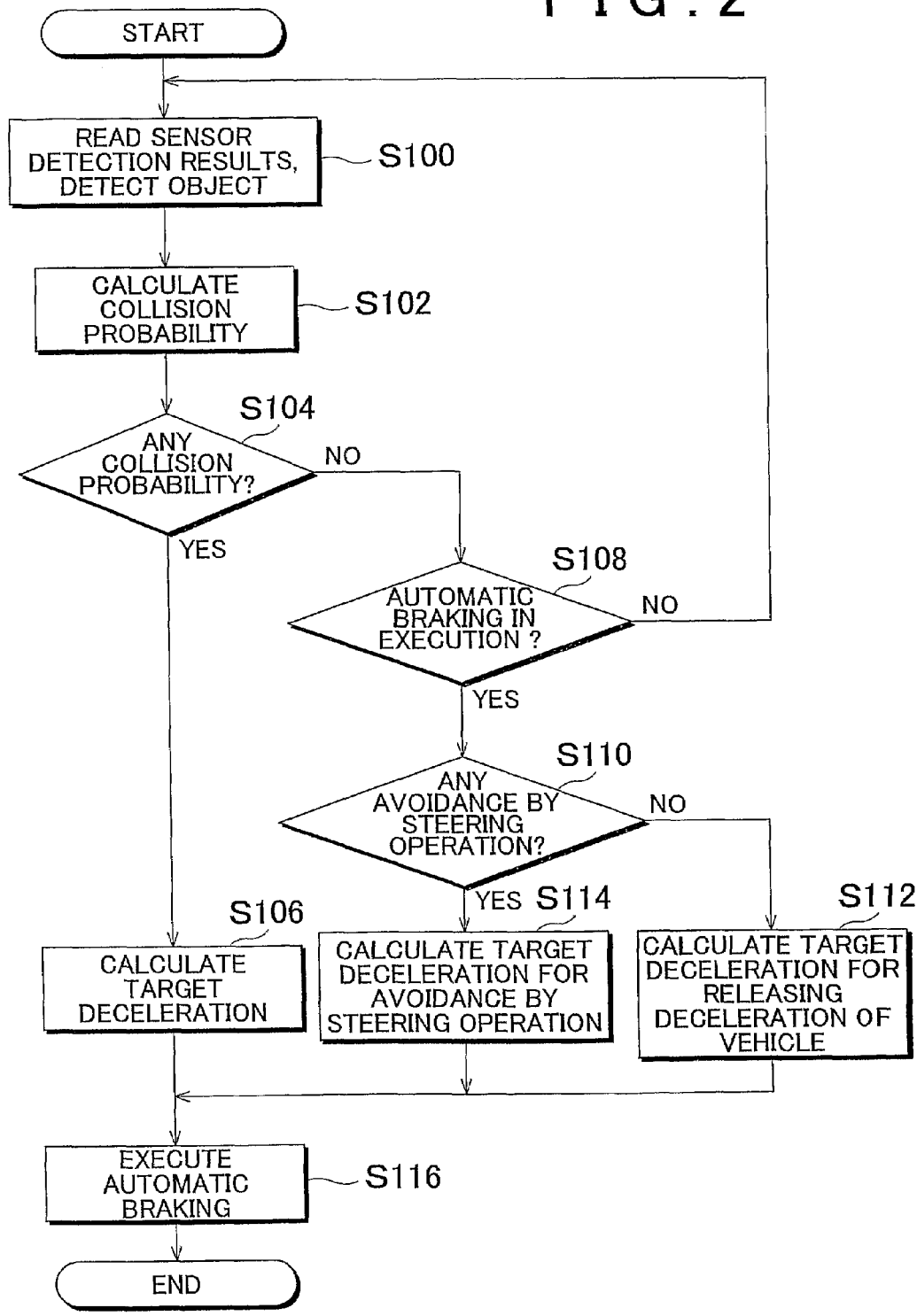
FIG. 2 is a flowchart showing the procedure of automatic braking control by the braking control system in accordance with the embodiment.

The operation of the braking control system 1 (first control mode) will now be described with reference to FIG. 2. FIG. 2 is a flowchart showing the procedure of automatic braking control by the braking control system 1. This automatic braking control is executed by the ECU 20, and executed at predetermined intervals when the ECU 20 is operating.

In step S100, the distance, speed, and direction relative to an object detected by the millimeter wave radar 10 and the stereo camera 11 are read, and various information acquired from the inter-vehicle/road-to-vehicle communication device 12 and the navigation system 13 is read. The results detected by the steering angle sensor 14, the yaw rate sensor 15, the lateral acceleration sensor 16, and the vehicle speed sensor 17 are also read.

Next, in step S102, the distance, speed, and direction relative to an object in the path of the vehicle such as another vehicle are obtained based on the results detected by the millimeter wave radar 10, the stereo camera 11 and so forth, and the various information from the inter-vehicle/road-to-vehicle communication device 12 and the navigation system 13, which are read in step S100, to calculate the likelihood of collision with the object.

Then, in step S104, it is determined whether the likelihood of collision with the object calculated in step S102 is equal to or more than a predetermined value, that is, whether the likelihood of collision is high. If it is determined that the likelihood of collision with the object is high, the process proceeds to step S106. On the other hand, if it is determined that the likelihood of collision is low, the process proceeds to step S108.

If it is determined that the likelihood of collision with the object is high, a target braking force for decelerating the vehicle in automatic braking (a target deceleration) is calculated in step S106. Then, in step S116, the brake actuator 30 is driven based on the target deceleration to execute automatic braking such that the target deceleration and the actual deceleration agree with each other. After that, the process is temporarily ended.

On the other hand, if it is determined that the likelihood of collision with the object is low in step S104, it is determined in step S108 whether automatic braking is being executed. If automatic braking is not being executed, that is, if it is not in the case where a collision with an object with which the likelihood of collision is high has been avoided, and, in addition, where the object with which the likelihood of collision is high is not continuously detected, the process proceeds to step S100, and the processes in steps S100 to S108 discussed above are executed repetitively until an object with which the likelihood of collision is high is detected. On the other hand, if automatic braking is being executed, that is, if a collision with an object, with which it has been determined that the likelihood of collision is high in the preceding process, is avoided, the process proceeds to step S110.

In step S110, it is determined whether a collision with the object is avoided through a steering operation by the driver, based on the detection results by the steering angle sensor 14 and the yaw rate sensor 15 read in step S100. If it is determined that collision with the object has been avoided through a means other than the steering operation by the driver, that is, if collision with the object is avoided only by a braking operation by the driver, or if the detection of the object or the determination as to the likelihood of collision with the object is erroneous, the process proceeds to step S112. On the other hand, if it is determined that collision with the object has been avoided by a steering operation by the driver, the process proceeds to step S114.

When it is determined that collision with an object is likely and automatic braking is started, and it is subsequently determined that the collision with the object has been avoided through a means other than the steering operation by the driver, in step S112, a target braking force for reducing deceleration of the vehicle with a predetermined gradient (a target deceleration) is calculated. Then, in step S116, the brake actuator 30 is driven based on the target braking force to reduce the deceleration at the predetermined gradient. After that, the process is temporarily ended.

On the other hand, when it is determined that a collision with an object is likely and automatic braking is started, and it is subsequently determined that a collision with the object has been avoided through a steering operation by the driver, in step S114, the target braking force (a target deceleration) is calculated in such a way as to reduce the deceleration of the vehicle at a gentler gradient (that is, to increase the duration of the automatic braking), than when a collision with the object has been avoided through a means other than the steering operation by the driver.

Figure 4:
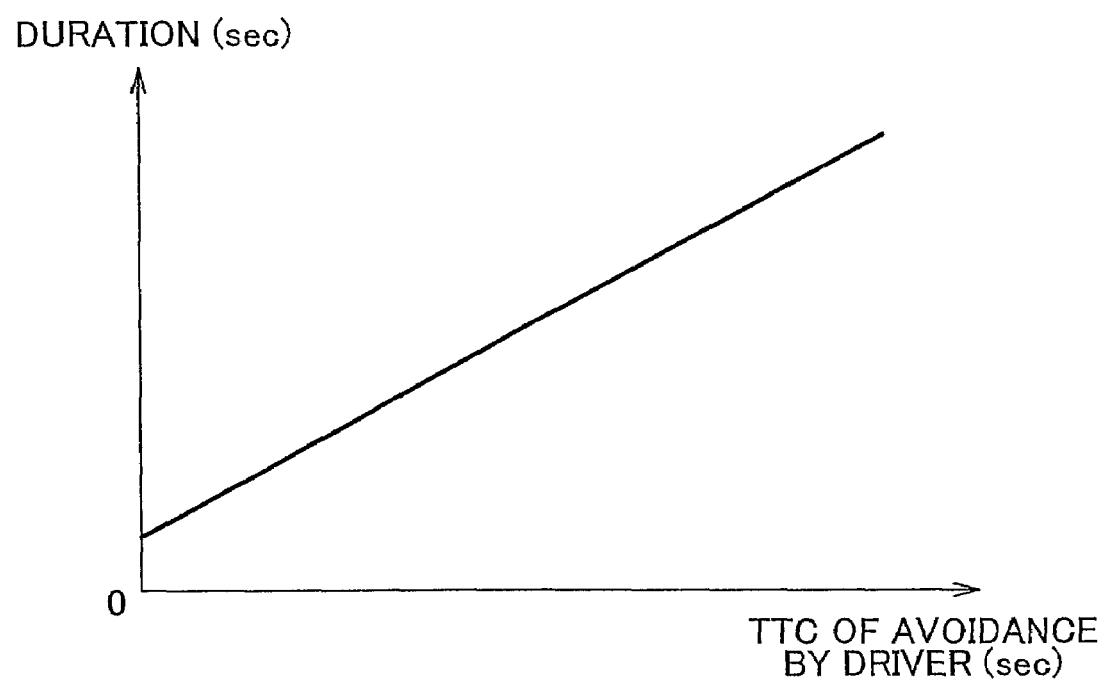
FIG. 4 is a chart showing the relation between estimated time to collision and the duration of automatic braking.

Now, the setting of the duration of automatic braking, that is, the gradient of the deceleration, will be described with reference to FIG. 4. FIG. 4 is a chart showing the relation between the estimated time to collision TTC and the duration of automatic braking. The estimated time to collision TTC is a value obtained by the following equation (1):

Estimated time to collision TTC=Distance between vehicle and obstacle/Relative speed (1).

In FIG. 4, the horizontal axis represents the estimated time to collision TTC (s) when the driver is steering to avoid the object, and the vertical axis represents the duration (s) of automatic braking. As shown in FIG. 4, as the estimated time to collision TTC when the driver is steering to avoid the object is longer, that is, when the driver begins steering to avoid the object earlier, the duration of automatic braking is set to be longer, that is, the gradient of the deceleration is set to be gentler.

Figure 5:
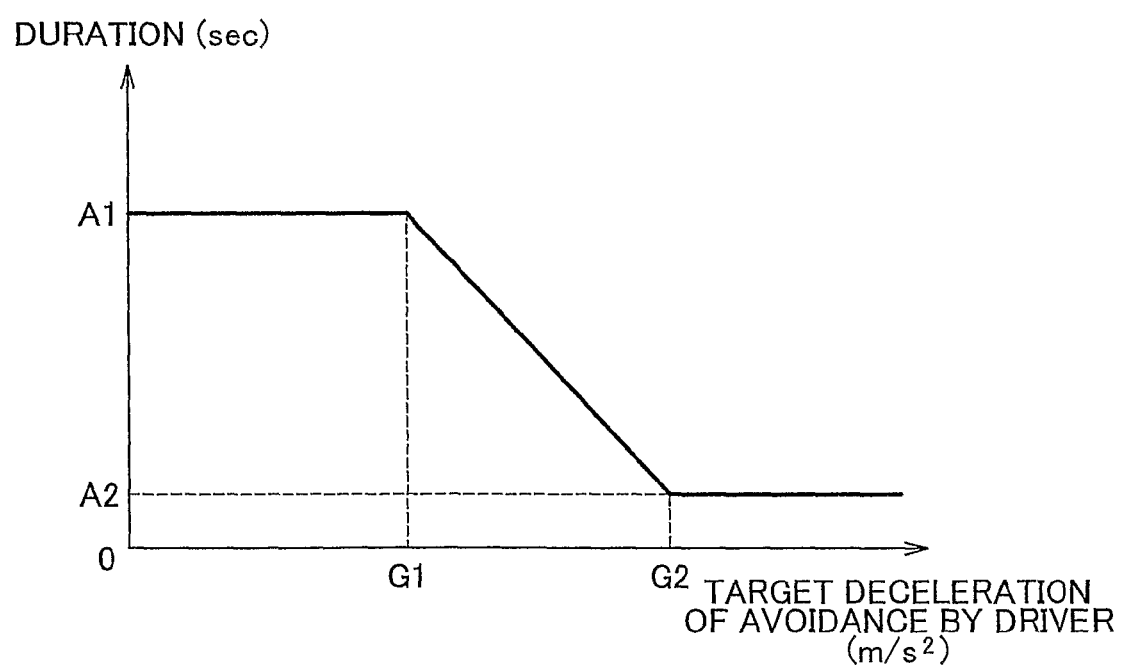
FIG. 5 is a chart showing the relation between the target deceleration and the duration of automatic braking.

As an alternative to the estimated time to collision TTC when the driver is steering to avoid the object, the duration of automatic braking may be set based on the target deceleration when the driver is steering to avoid the object. In this case, it is assumed that the target deceleration increases as the estimated time to collision TTC reduces. The relation between the target deceleration and the duration of automatic braking is shown in FIG. 5. In FIG. 5, the horizontal axis represents the target deceleration ($m/s^2$) when the driver is steering to avoid the object, and the vertical axis represents the duration (s) of automatic braking. As shown in FIG. 5, in the region where the target deceleration when the driver is steering to avoid the object is from 0 to less than G1, the duration of automatic braking is set to a predetermined value A1. In the region where the target deceleration is from G1 to less than G2, the duration reduced (that is, a steeper gradient of the deceleration is set) as the target deceleration is larger (that is, the timing of avoidance by a steering operation is later). In the region where the target deceleration is G2 or more, the duration is set to a predetermined value A2.

The duration of automatic braking may be set based on another indicator of a steering operation, such as the lateral force of a tire, the lateral acceleration of the vehicle, the steering amount, and the vehicle speed.

Returning to FIG. 2 to continue the description, in the subsequent step S116, the brake actuator 30 is driven based on the target braking force (target deceleration) determined according to the duration of automatic braking set in step S114, to execute automatic braking such that the target deceleration and the actual deceleration agree with each other. After that, the process is temporarily ended.

Figure 3:
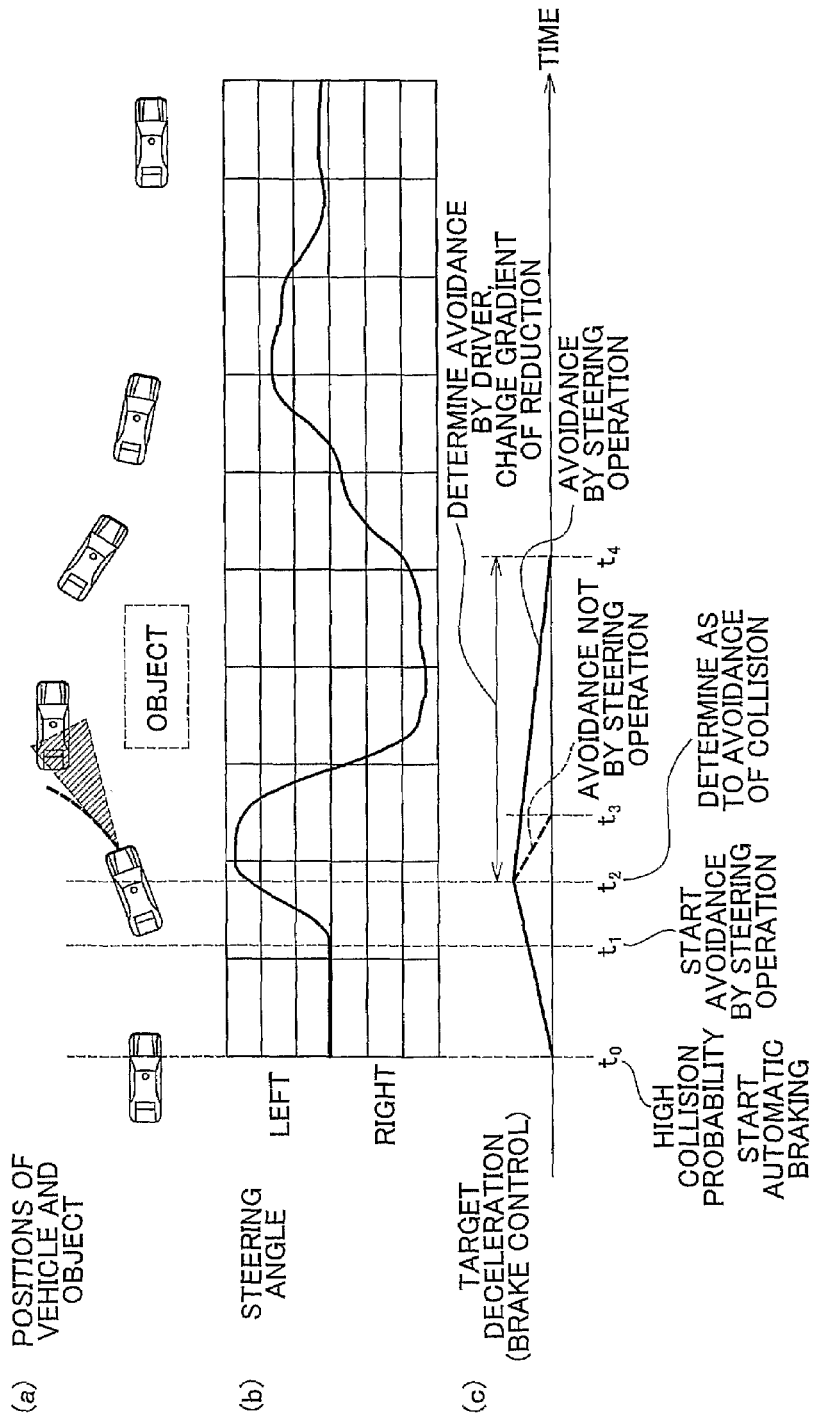
FIG. 3 is a diagram for explaining a first control mode.

Now, the operation (first control mode) of the braking control system 1 is described sequentially with reference to FIGS. 3A to 3C. FIGS. 3A to 3C illustrate the first control mode. In FIGS. 3A to 3C, the horizontal axis represents the time. FIG. 3A shows an example of the positional relation between the vehicle and an obstruction at each time. FIG. 3B shows an example of the steering angle. FIG. 3C shows an example of changes in target deceleration (target braking force).

First, at time t0, it is determined that a collision with a detected object in the path of the vehicle is likely, based on the distance, speed, and direction relative to the object. Then, a target braking force (a target deceleration) is set based on the estimated time to collision TTC or the like, and automatic braking is executed according to the target deceleration. From time t0, when it is determined that a collision with the object is likely, to time t2, when it is determined that a collision with the object has been avoided through a steering operation by the driver, the target deceleration is set to gradually increase as the estimated time to collision TTC decreases (see FIG. 3C).

Then, at time t1, the driver turns the steering wheel to the left (see FIG. 3B) to avoid colliding with the object, and the vehicle starts turning to the left (see FIG. 3A).

Subsequently, at time t2, it is determined that collision with the object is avoided through the steering operation by the driver. Then, the deceleration of the vehicle is reduced with a gentler gradient (that is, the duration of automatic braking is made longer) from time t2 to time t4 (see the solid line of FIG. 3C). On the other hand, if it is determined at time t2 that a collision with the object is avoided through a means other than the steering operation by the driver, the deceleration of the vehicle is reduced with a steeper gradient from time t2 to time t3 (see the broken line of FIG. 3C).

According to this control mode, when it is determined that a collision with an object has been avoided through a steering operation by the driver, the duration of automatic braking is increased in comparison to when it is determined that collision with the obstruction has been avoided through a means other than the steering operation by the driver. Thus, it is possible to restrict changes in pitch of the vehicle due to cancellation of the automatic braking. As a result, it is possible to cancel the automatic braking while preventing the behavior of the vehicle from becoming unstable.

In addition, according to this control mode, a gentler gradient is used to reduce the braking force so that the braking force is gradually reduced. Thus, it is possible to restrict changes in pitch of the vehicle due to cancellation of the automatic braking.

According to this control mode, the duration of automatic braking, that is, the gradient of reduction in deceleration, is set according to the estimated time to collision TTC or the like. Thus, it is possible to set a more appropriate duration based on the behavior of the vehicle.

In the first control mode discussed above, the duration of automatic braking is increased by setting a gentler gradient for the target braking force. However, the duration of automatic braking may be increased by extending the time for maintaining a constant target deceleration (second control mode).

Figure 6:
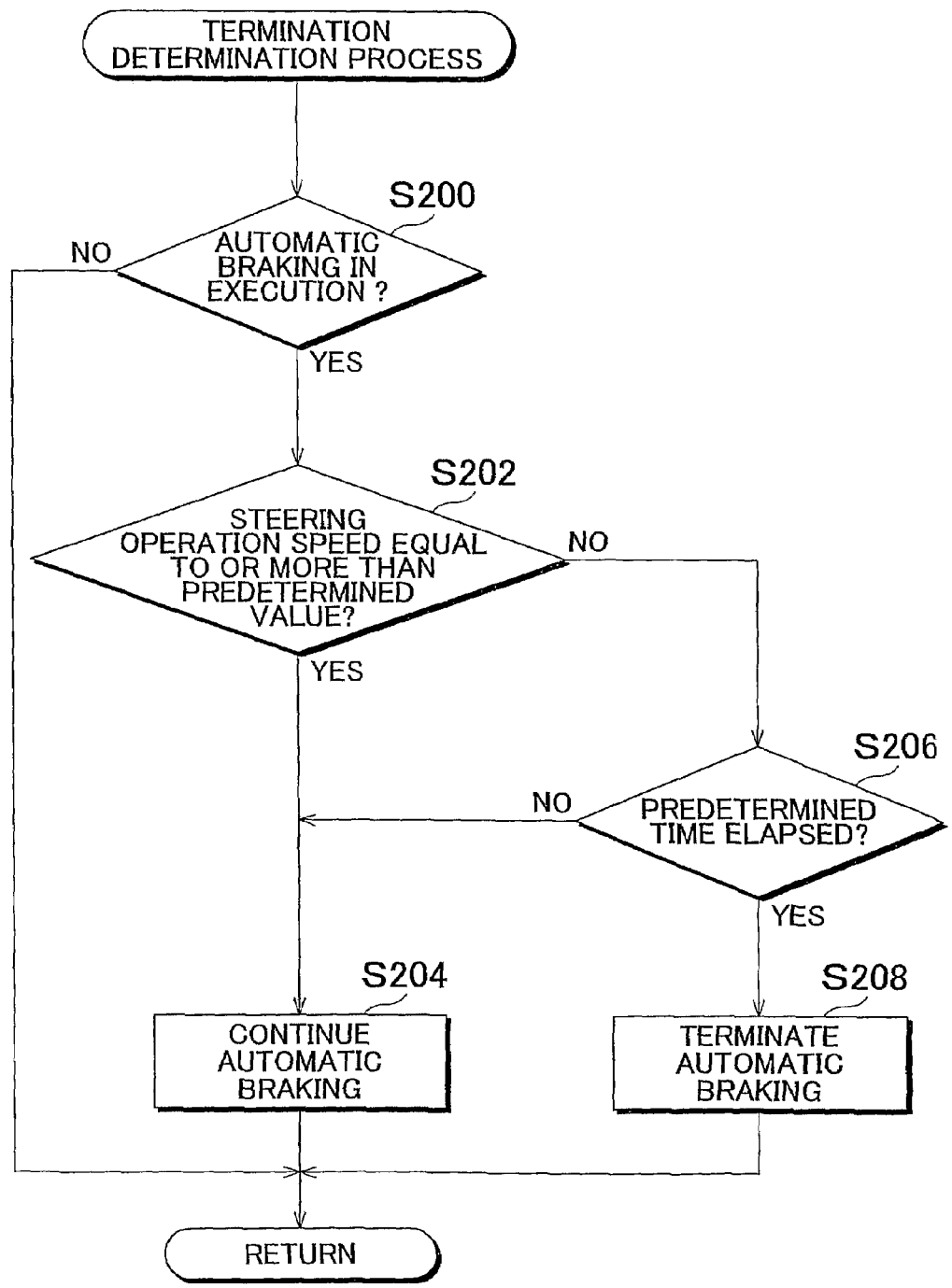
FIG. 6 is a flowchart showing the procedure of a termination determination process in the automatic braking control.
Figure 7:
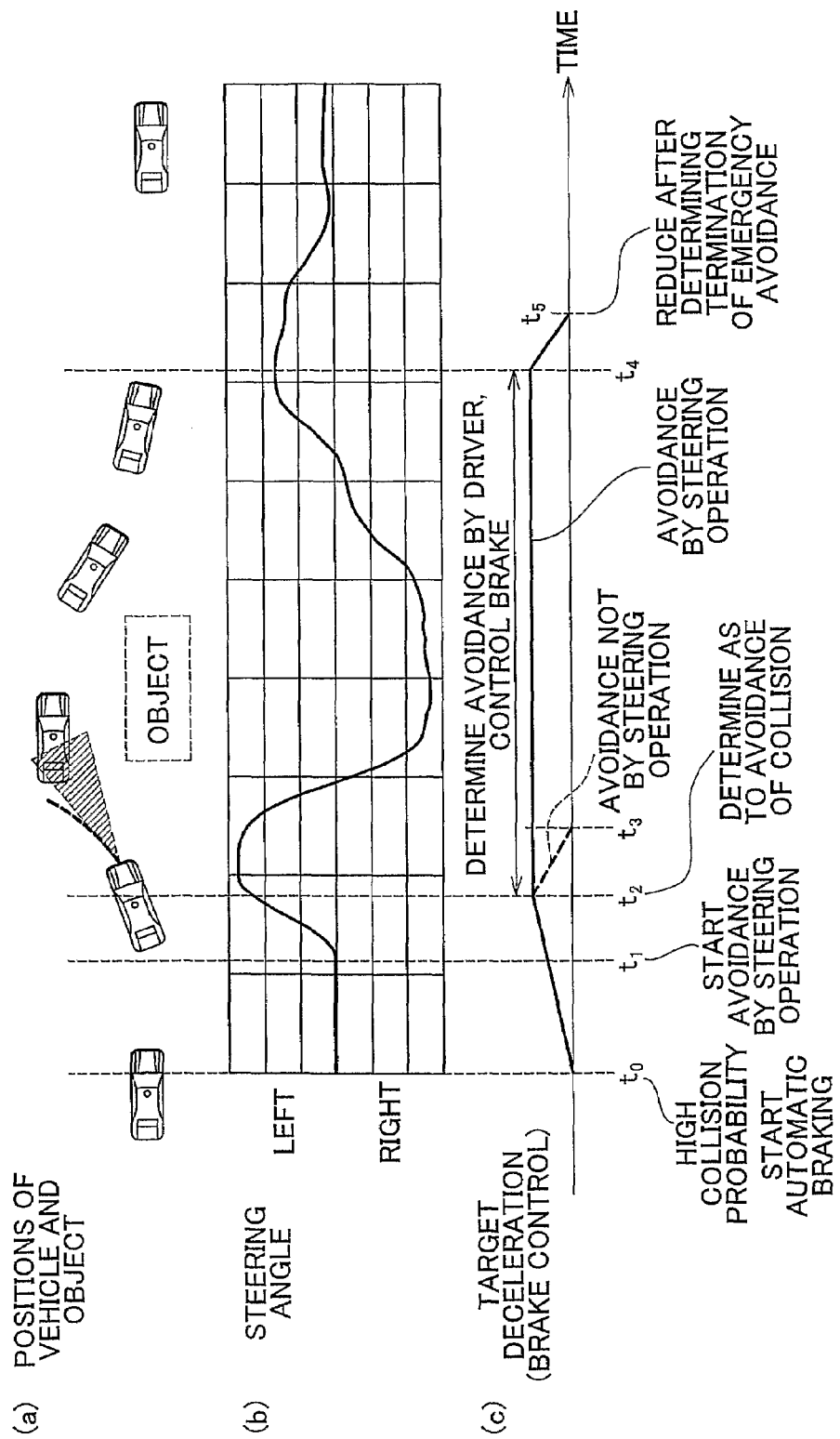
FIG. 7 is a diagram for explaining a second control mode.

Now, a second control mode is described with reference to FIG. 6 and FIGS. 7A to 7C. FIG. 6 is a flowchart showing the procedure of a termination determination process in the automatic braking control. FIGS. 7A to 7C illustrate the second control mode. In FIGS. 7A to 7C, the horizontal axis represents the time. FIG. 7A shows an example of the positional relation between the vehicle and an obstruction at each time. FIG. 7B shows an example of the steering angle. FIG. 7C shows an example of changes in target deceleration (target braking force).

The second control mode is differs from the first control mode discussed above, in that: if it is determined at time t2 that collision with an object is avoided through a steering operation by the driver, a constant target deceleration (target braking force) is maintained from time t2 to time t4, and subsequently the target deceleration is reduced with a predetermined gradient from time t4 to time t5, as shown in FIG. 7C. This difference will be mainly described hereinafter with reference to FIG. 6. The same or similar description to the first control mode discussed above will not be repeated.

The termination determination process shown in FIG. 6 is executed in place of step S114 discussed above. That is, the processes other than that in step S114 are the same as those in the first control mode, and thus will not be described here.

In step S200, it is determined whether automatic braking is being executed. If automatic braking is not being executed, the process is temporarily ended. On the other hand, if automatic braking is being executed, the process proceeds to step S202.

In step S202, it is determined whether the steering operation speed, which is obtained based on changes in steering angle detected by the steering angle sensor 14, is equal to or more than a predetermined value. If the steering operation speed is equal to or more than the predetermined value, that is, when the driver is operating the steering wheel relatively rapidly, it is presumed that the driver is steering to avoid the object. Thus, in step S204, the automatic braking is continued with a constant target braking force.

On the other hand, if the steering operation speed is below the predetermined value, it is presumed that the steering operation for avoidance by the driver is finished, and the process proceeds to step S206.

In step S206, it is determined whether a predetermined time has elapsed since the steering operation speed has become less than the predetermined value. If the predetermined time has not elapsed, it is presumed that the behavior of the vehicle has not been sufficiently stabilized yet, and the process proceeds to step S204. In step S204, the automatic braking is continued while a constant target braking force is maintained, as discussed above.

On the other hand, if the predetermined time has elapsed after the steering operation speed has become less than the predetermined value, it is presumed that the behavior of the vehicle has been sufficiently stabilized, and the process proceeds to step S208, where the automatic braking is terminated. That is, the target deceleration is reduced with a predetermined gradient, and the automatic braking is terminated. After that, the process is temporarily ended.

According to this control mode, a constant target deceleration (target braking force) is maintained for a predetermined period. Thus, it is possible to stabilize the behavior of the vehicle due to a steering operation for avoidance over that period. As a result, automatic braking is canceled after the behavior of the vehicle is sufficiently stabilized. Consequently, it is possible to cancel automatic braking while preventing the behavior of the vehicle from becoming unstable as a result of the cancellation of automatic braking.

In addition, according to this control mode, it is presumed that the behavior of the vehicle has been stabilized when a predetermined time has elapsed since the steering operation speed has become less than a predetermined value. Thus, it is possible to determine with accuracy whether the behavior of the vehicle has been stabilized.

Although the determination as to termination of automatic braking is based on the steering operation speed and the elapsed time in this control mode, the determination as to termination of automatic braking may be made otherwise. For example, the duration of automatic braking may be set based on another indicator of a steering operation, such as the lateral force of a tire, the lateral acceleration of the vehicle, the steering amount, and the vehicle speed.

Figure 8:
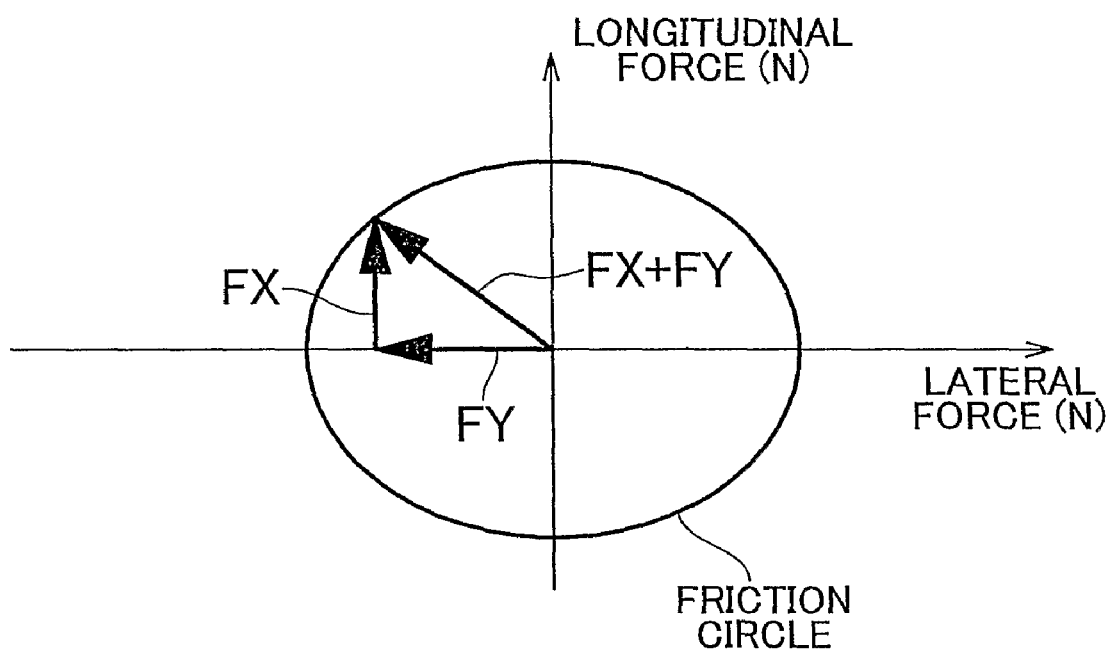
FIG. 8 is a diagram for explaining how to set the target deceleration.

Although the target deceleration (target braking force) is kept constant for a predetermined time in the second control mode, the target deceleration may be controlled so as to be continuously variable during automatic braking. Now, the process of setting a continuously variable target deceleration (third control mode) will be described with reference to FIG. 8. FIG. 8 is a diagram for explaining how to set the target deceleration.

The ellipse shown in FIG. 8 is a friction circle of a tire. In FIG. 8, the horizontal axis represents the lateral force (N), and the vertical axis represents the longitudinal force (N). As shown in FIG. 8, a lateral force FY is generated in the tire during steering operation for avoidance. A longitudinal force FX that is generated by the tire is calculated based on the maximum force that can be generated by the tire (FX+FY, friction circle) and the lateral force FY, and a target deceleration is set according to the longitudinal force FX. Then, the brake actuator 30 is driven to make the set target deceleration and the actual deceleration agree with each other.

During braking, the load shifts to the front, which reduces the gripping force of the rear tires and tends to cause oversteer. Thus, a target deceleration of the rear tires may be calculated by subtracting a predetermined value $\alpha$ from the target deceleration set as discussed above, to improve the stability of the vehicle.

According to this control mode, the target deceleration may be continuously varied according to the lateral force of a tire during steering operation for avoidance. Thus, it is possible to set a more appropriate target deceleration based on the behavior of the vehicle.

Example embodiments of the present invention have been described above. The present invention is not limited to the described embodiments, and may be modified in various ways. For example, a monocular camera may be used in place of the stereo camera used in the above embodiments. Also, a laser radar or the like may be used in place of the millimeter wave radar.

The invention claimed is:

1. A braking control system comprising:
   a collision probability determination device that determines a likelihood of collision with an object;
   a braking device that automatically applies a braking force based on a determination result by the collision probability determination device; and
   a steering operation detection device for detecting a steering operation by a driver,
   wherein when a determination is made that a collision with the object is likely and automatic braking is started, and a subsequent determination is made that the collision with the object is avoided through a steering operation by the driver, the braking device increases a duration of the automatic braking in comparison to when a collision with the object is avoided not through the steering operation by the driver.

2. The braking control system according to claim 1, wherein the braking device makes a gradient with which to reduce the braking force smaller in order to increase the duration of the automatic braking.

3. The braking control system according to claim 1, wherein the braking device increases a time for maintaining a constant braking force in order to increase the duration of the automatic braking.

4. The braking control system according claim 1, further comprising:
   an avoidance indicator detection device that detects an indicator of a steering operation,
   wherein the braking device sets a magnitude of the braking force based on the indicator detected by the avoidance indicator detection device.

5. The braking control system according to claim 4, wherein the indicator of a steering operation is a lateral force of a tire, a lateral acceleration of a vehicle, a steering amount, and a vehicle speed.

6. The braking control system according to claim 1, further comprising:
   an avoidance indicator detection device that detects an indicator of a steering operation, and wherein the braking device sets the duration of the automatic braking based on the indicator detected by the avoidance indicator detection device.

7. The braking control system according to claim 6, wherein the indicator of a steering operation is a lateral force of a tire, a lateral acceleration of a vehicle, a steering amount, and a vehicle speed.

8. A braking control method comprising:
  determining a likelihood of collision with an object;
  automatically applying a braking force based on the likelihood of collision;
  detecting a steering operation by a driver; and
  when a determination is made that a collision with the object is likely and automatic braking is started, and a subsequent determination is made that collision with the object is avoided through a steering operation by a driver, increasing a duration of the automatic braking in comparison to when a collision with the object is avoided not through the steering operation by the driver.

9. The braking control method according to claim 8, wherein the duration of the automatic braking is increased by making a gradient with which to reduce the braking force smaller.

10. The braking control method according to claim 8, wherein the duration of the automatic braking is increased by increasing a time for maintaining a constant braking force.

11. The braking control method according to claim 8, further comprising:
  detecting an indicator of a steering operation; and
  setting a magnitude of the braking force based on the detected indicator.

12. The braking control method according to claim 11, wherein the indicator of a steering operation is a lateral force of a tire, a lateral acceleration of a vehicle, a steering amount, and a vehicle speed.

13. The braking control method according to claim 8, further comprising:
  detecting an indicator of a steering operation; and
  setting the duration of the automatic braking based on the detected indicator.

14. The braking control method according to claim 13, wherein the indicator of a steering operation is a lateral force of a tire, a lateral acceleration of a vehicle, a steering amount, and a vehicle speed.

* * * * *